US011024957B1

United States Patent
Ananth et al.

(10) Patent No.: US 11,024,957 B1
(45) Date of Patent: Jun. 1, 2021

(54) TRIGGERED GENERATION OF NULLING SIGNALS TO NULL AN RF BEAM USING A DETACHABLE NULLING SUBASSEMBLY

(71) Applicant: Loon LLC, Mountain View, CA (US)

(72) Inventors: Sharath Ananth, Cupertino, CA (US); Cyrus Behroozi, Menlo Park, CA (US); Nevin Morris, San Jose, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 16/838,062

(22) Filed: Apr. 2, 2020

(51) Int. Cl.
*H01Q 3/26* (2006.01)
*H04B 7/185* (2006.01)

(52) U.S. Cl.
CPC ....... *H01Q 3/2611* (2013.01); *H04B 7/18504* (2013.01)

(58) Field of Classification Search
CPC ... H01Q 19/00; H01Q 13/0233; H01Q 19/005
See application file for complete search history.

(56) References Cited

U.S. PATENT DOCUMENTS

| | | | |
|---|---|---|---|
| 6,078,289 A | 6/2000 | Manoogian et al. | |
| 8,791,853 B2 | 7/2014 | Mitchell | |
| 9,484,634 B1* | 11/2016 | Behroozi | H01Q 9/40 |
| 9,647,748 B1 | 5/2017 | Mitchell | |
| 9,973,268 B1* | 5/2018 | Husted | H04B 7/18534 |
| 9,998,204 B2 | 6/2018 | Chiodini et al. | |
| 10,236,968 B2 | 3/2019 | Alex | |
| 2016/0380353 A1* | 12/2016 | Lysejko | 343/872 |
| 2017/0093363 A1* | 3/2017 | Tabatabai | H01Q 3/2694 |
| 2017/0272131 A1 | 9/2017 | Ananth et al. | |
| 2018/0090830 A1* | 3/2018 | McMichael | H01Q 1/241 |
| 2019/0379432 A1* | 12/2019 | Monir Vaghefi | H01Q 1/246 |
| 2020/0403666 A1* | 12/2020 | Kapetanovic | H04B 7/0634 |

FOREIGN PATENT DOCUMENTS

| | | | | |
|---|---|---|---|---|
| CN | 109524797 A | * | 3/2019 | |
| CN | 210576481 U | * | 5/2020 | |
| GB | 2576203 A | * | 2/2020 | ............ H04W 48/20 |
| KR | 100948265 B1 | | 3/2010 | |
| WO | WO-2016207596 A1 | * | 12/2016 | |
| WO | WO-2019236913 A1 | * | 12/2019 | ............ H01Q 21/20 |

OTHER PUBLICATIONS

P. Allison et al., Dynamic tunable notch filters for the Antarctic Impulsive Transient Antenna (ANITA), arXiv:1709.04536v1 [astro-ph.IM]Sep. 13, 2017, pp. 1-27.

* cited by examiner

*Primary Examiner* — Mohammed Rachedine
(74) *Attorney, Agent, or Firm* — Botos Churchill IP Law

(57) ABSTRACT

A method and apparatus are provided for nulling a radio frequency (RF) beam for a high-altitude platform (HAP). A transmitter generates an RF signal. A primary antenna system generates an RF beam based on the RF signal. One or more processors determine a result indicating whether to modify the RF beam. When the result indicates to modify the RF beam, a detachable nulling subassembly generates nulling signals based on the RF signal to modify the RF beam generated by the primary antenna system.

19 Claims, 10 Drawing Sheets

100

300

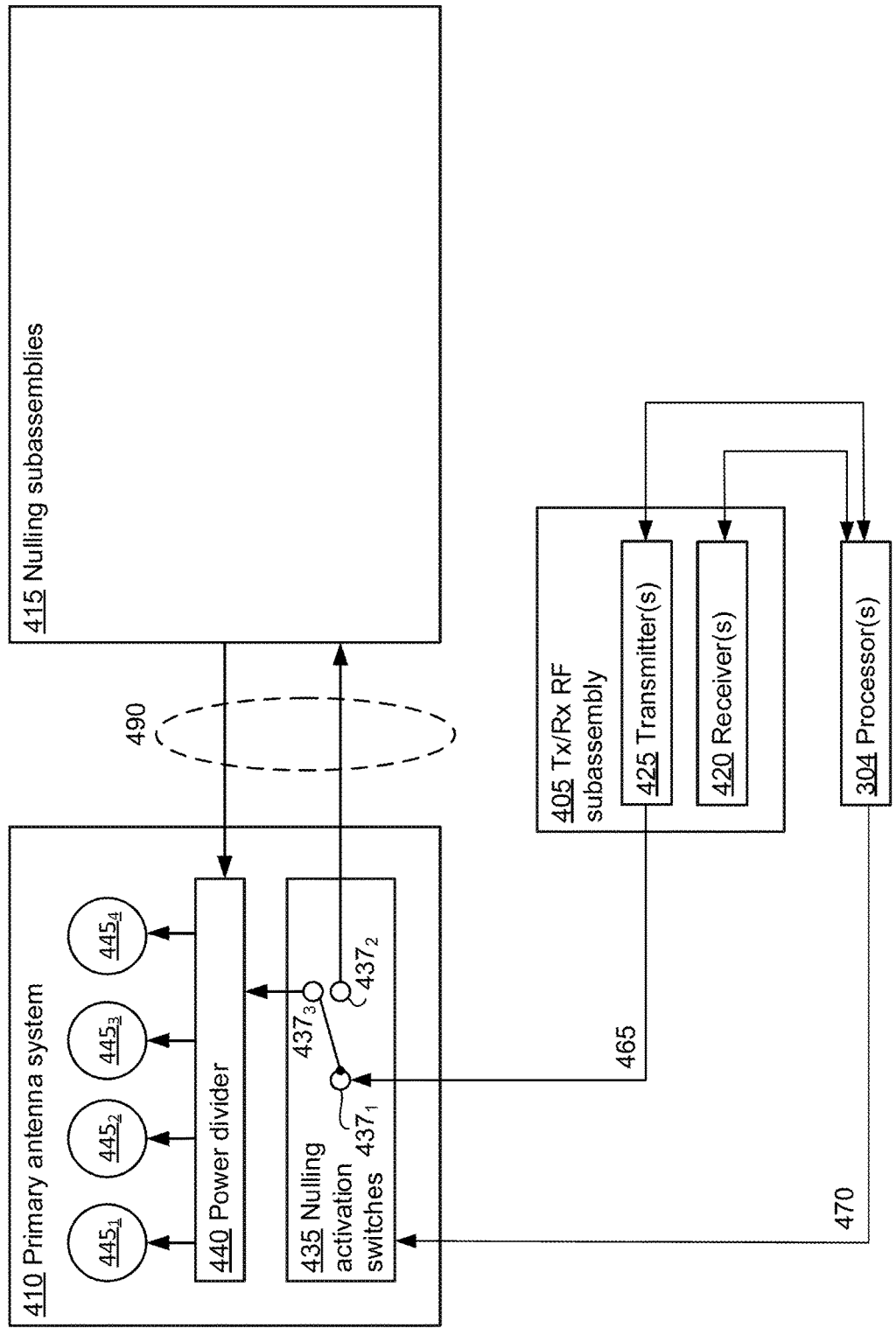

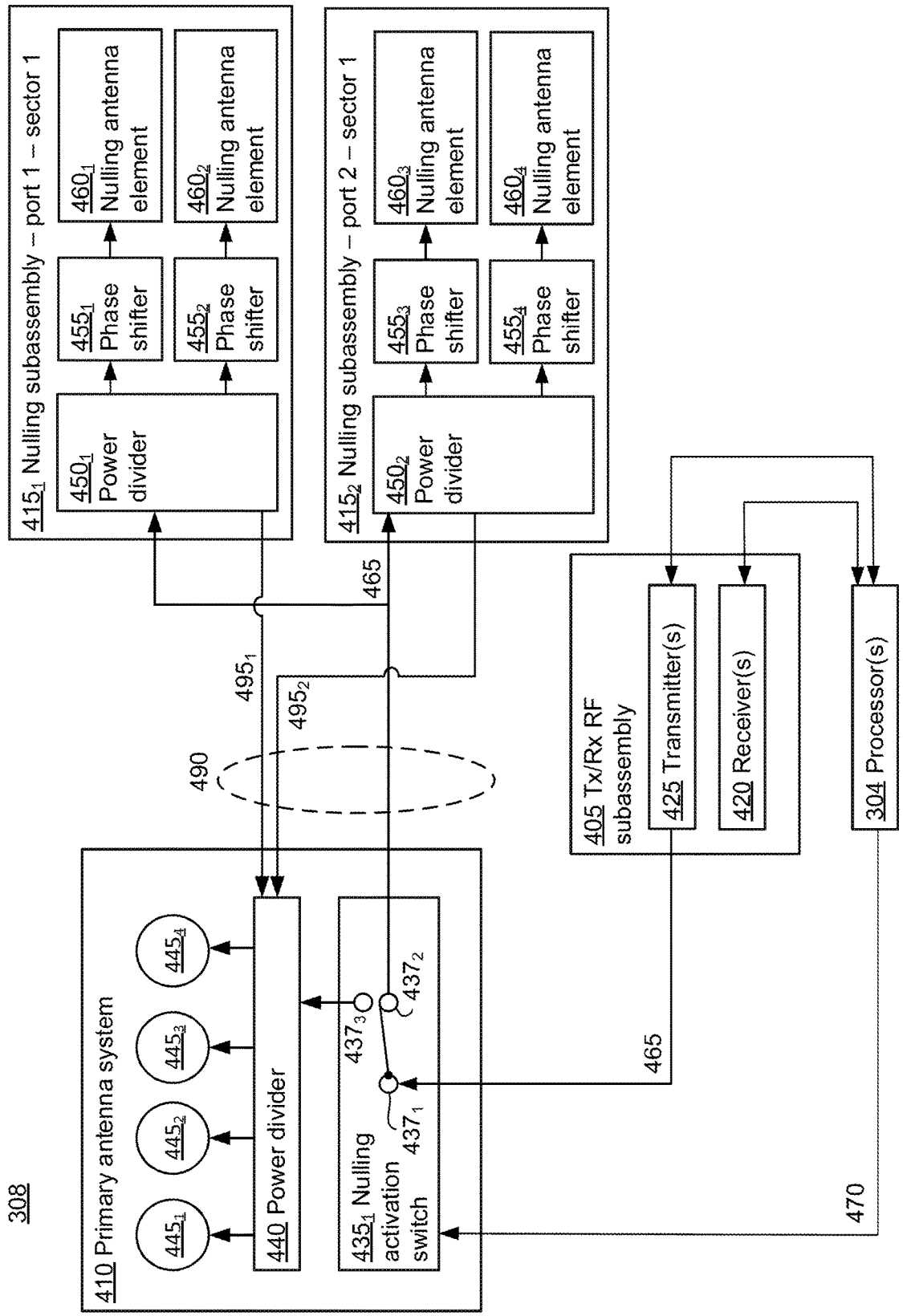
FIG. 4B  NULLING ENABLED

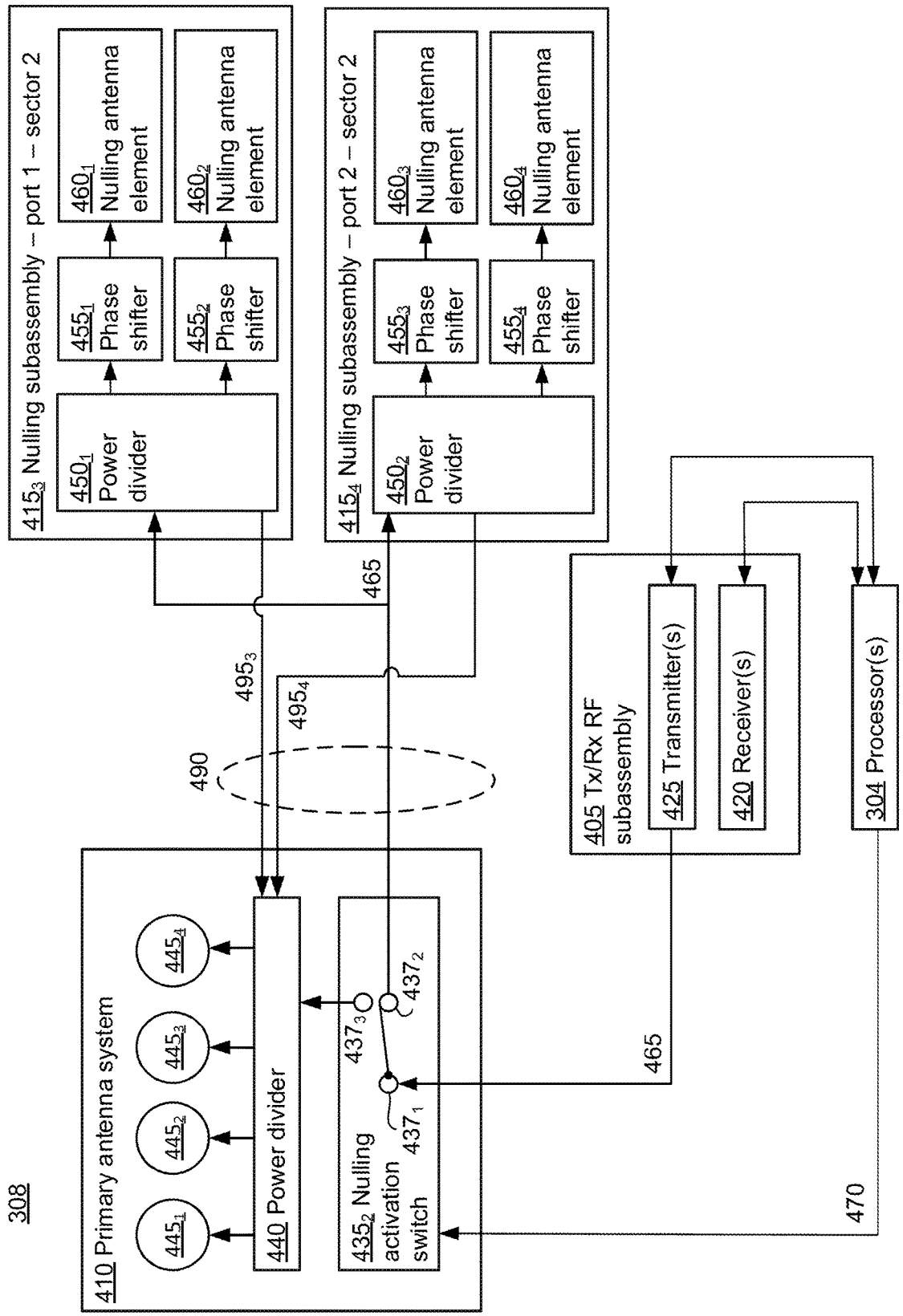

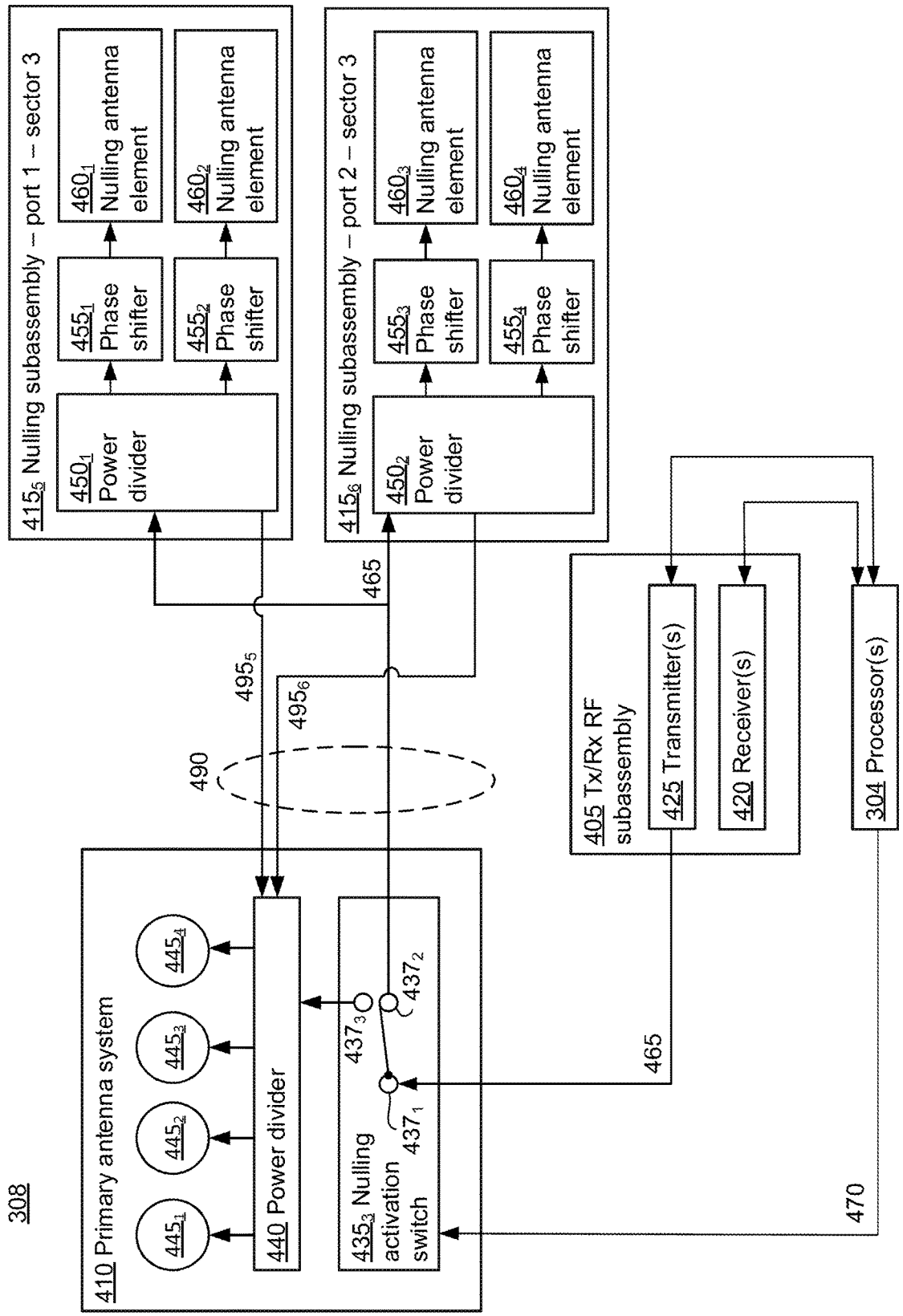

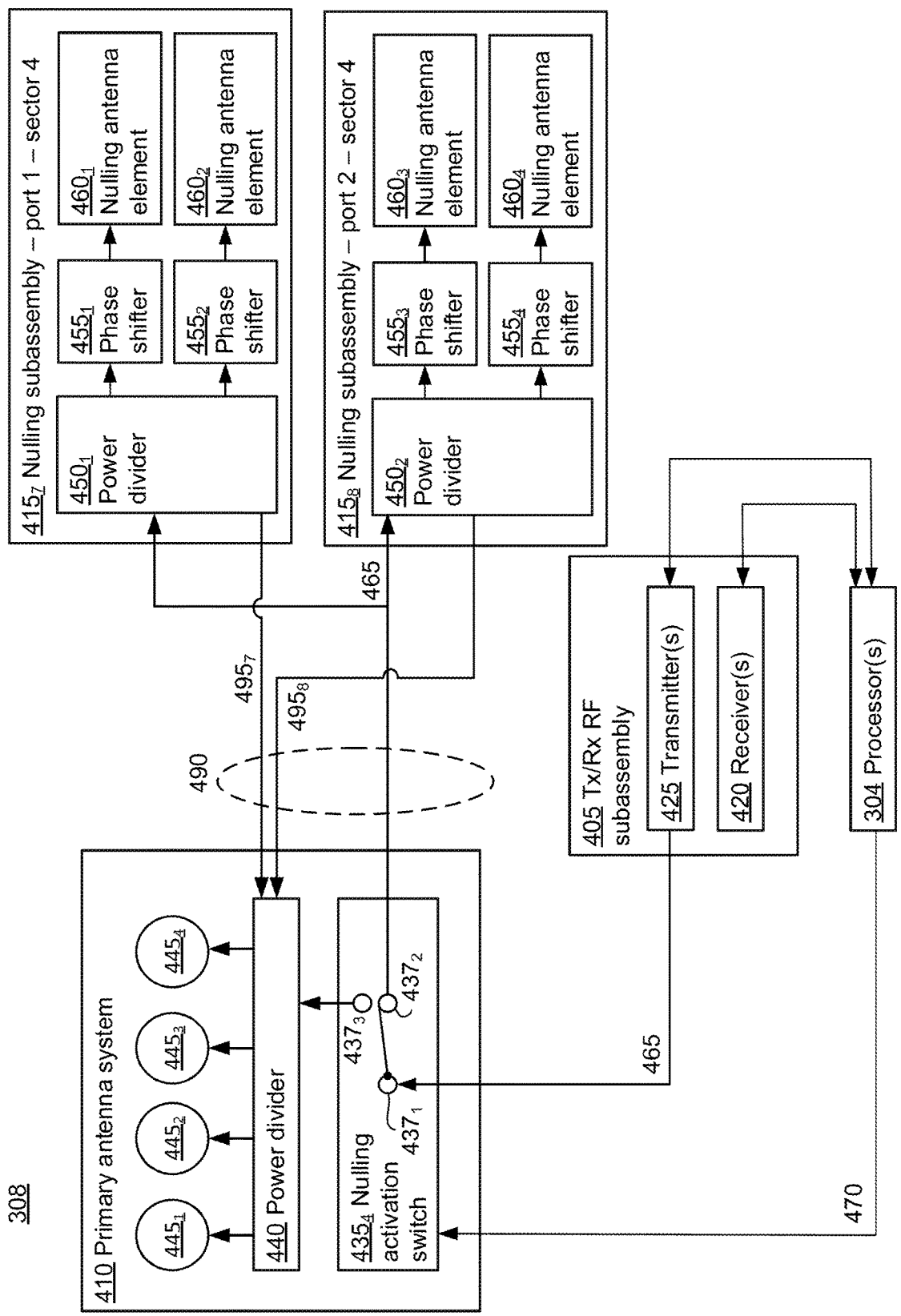
FIG. 4E  NULLING ENABLED

500

TRIGGERED GENERATION OF NULLING SIGNALS TO NULL AN RF BEAM USING A DETACHABLE NULLING SUBASSEMBLY

BACKGROUND

An antenna system in a high-altitude platform (HAP), such as a balloon, may provide coverage to a large area on the ground. Interference is of minimal concern when the HAP flies over sparsely populated regions. However, in some situations, the HAP may fly close to country borders or close to terrestrial communication towers. In these situations, it is more likely to encounter interference, and likely reduce the coverage and capacity of the HAP.

BRIEF SUMMARY

An antenna system including a detachable nulling subassembly may be provided in the HAP. The detachable notch element subassembly may include a plurality of notch antenna elements that may be individually activated and deactivated through the use of a nulling activation switch. The detachable nulling subassembly may be configured to easily attach and detach (or otherwise engage or disengage) to/from an interface of a primary antenna system, prior to the launch of the HAP for a particular mission.

In particular, the detachable nulling subassembly may include one or more nulling antenna elements configured to modify an antenna pattern footprint (i.e., a beamforming signal) of a primary antenna system of the HAP. The antenna pattern footprint on the ground provided through the use of the primary antenna system may be modified when one or more of the nulling antenna elements are activated or deactivated. For example, at least a portion of the antenna pattern footprint may be reduced in size when a notch element is activated, and expanded or returned to its original footprint when the nulling antenna elements are deactivated.

A balloon-based communication system may have four sectors, where each sector may generally have an unmodified beam pattern that extends 150 km (or more or less) in a particular geographical direction. The long term evolution (LTE) footprint may be limited to a 100 km radius, but the splatter (extra energy) may extend out to 150 km. Activation of the notch subassembly (nulling elements) may reduce this beam pattern with a resultant modified beam pattern that only extends 80 km (or more or less) in the particular geographical direction. In one aspect, a communication apparatus for a HAP includes a transmitter configured to generate an RF signal, a primary antenna system configured to generate an RF beam based on the RF signal, the primary antenna system including a first plurality of antenna elements, a first power divider, and a nulling activation switch having at least a first contact and a second contact, and a detachable nulling subassembly in communication with the nulling activation switch. The detachable nulling subassembly may be configured to modify the RF beam generated by the primary antenna system by generating nulling signals when the nulling activation switch is controlled to feed the RF signal to an input of the detachable nulling subassembly. The first power divider may include an input in communication with the transmitter, and a plurality of outputs. The input of the first power divider may receive the RF signal from the transmitter, and the plurality of outputs of the first power divider are coupled to respective antenna elements of the primary antenna system. The detachable nulling subassembly may include a second power divider having an input and a plurality of outputs, a plurality of phase shifters, and a plurality of nulling antenna elements. The detachable nulling subassembly may be in communication with the nulling activation switch via an interface. The interface may be a wired or wireless interface. The interface may be a wired harness connector. The detachable nulling subassembly may be in communication with the second contact of the nulling activation switch. The transmitter may be in communication with the first contact of the nulling activation switch. The RF signal may be fed to the input of the second power divider when the nulling activation switch is closed such that the first contact is connected to the second contact. Each output of the second power divider may feed the RF signal to a respective processing chain including a phase shifter connected in series with a nulling antenna element. A position of the nulling activation switch is controlled based on one or more of a location of a high-altitude platform, knowledge of ground terrestrial locations, knowledge of country borders, and knowledge of service regions. A limit may be established as to a total power flux density across borders that should not be exceeded from a sum of all HAP transmissions or a total power flux density to terrestrial towers from the sum of all HAP transmissions.

In another aspect, a method is provided for nulling an RF beam for a HAP. The method includes generating, by a transmitter, an RF signal, generating, by a primary antenna system, an RF beam, determining, by one or more processors, a result indicating whether to modify the beamforming signal, and when the result indicates to modify the beamforming signal, generating, by a detachable nulling subassembly based on the RF signal, nulling signals to modify the beamforming signal generated by the primary antenna system.

BRIEF DESCRIPTION OF THE DRAWINGS

FIGS. 4A-4E show a communication system including detachable nulling subassemblies and a primary antenna system including a nulling activation switch in accordance with aspects of the technology.

DETAILED DESCRIPTION

Example Networks

Figure 1:
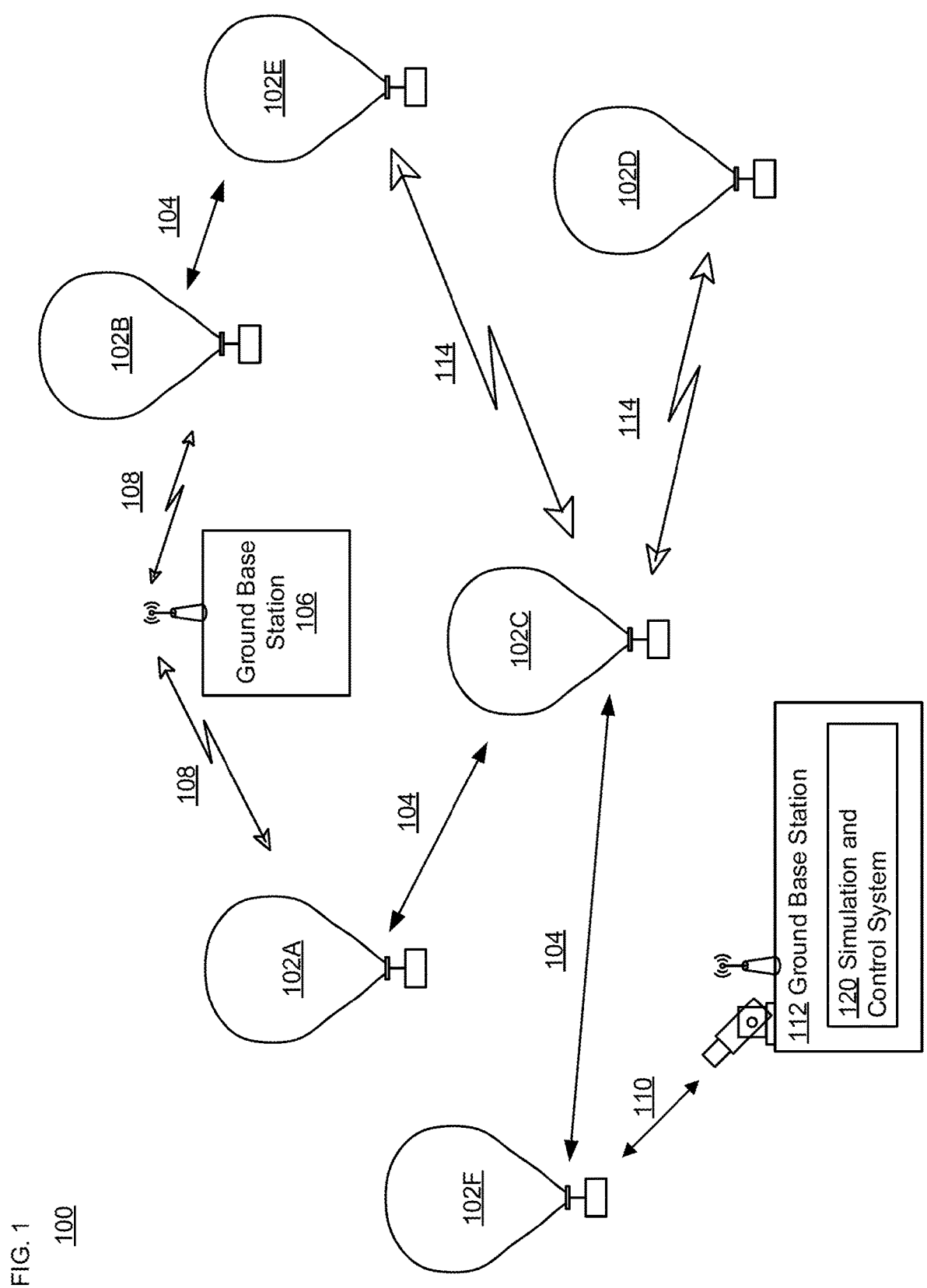
FIG. 1 is a functional diagram of an example system in accordance with aspects of the technology.

FIG. 1 depicts an example system 100 in which a fleet of balloons or other high altitude platforms described above may be used. This example should not be considered as limiting the scope of the disclosure or usefulness of the features described herein. System 100 may be considered a balloon network. In this example, balloon network 100 includes a plurality of devices, such as balloons 102A-F as well as ground base stations 106 and 112. Balloon network 100 may also include a plurality of additional devices, such as various devices supporting a telecommunication service (not shown) as discussed in more detail below or other systems that may participate in the network.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities. In one example using LTE communication, the base stations may be Evolved Node B (eNodeB) base stations. In another example, they may be base transceiver station (BTS) base stations. These examples are not limiting.

In some examples, the links may not provide a desired link capacity for HAP-to-ground communications. For instance, increased capacity may be desirable to provide backhaul links from a ground-based gateway. Accordingly, an example network may also include balloons, which could provide a high-capacity air-ground link between the various balloons of the network and the ground base stations. For example, in balloon network 100, balloon 102F may be configured to directly communicate with station 112.

Like other balloons in network 100, balloon 102F may be operable for communication (e.g., RF or optical) with one or more other balloons via link(s) 104. Balloon 102F may also be configured for free-space optical communication with ground-based station 112 via an optical link 110. Optical link 110 may therefore serve as a high-capacity link (as compared to an RF link 108) between the balloon network 100 and the ground-based station 112. Balloon 102F may additionally be operable for RF communication with ground-based stations 106. In other cases, balloon 102F may only use an optical link for balloon-to-ground communications.

The balloon 102F may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of HAPs (e.g., drones, airplanes, airships, etc.) in addition to, or as an alternative to, a ground based communication link. In some embodiments, a balloon may communicate with a satellite or a high altitude platform via an optical or RF link. However, other types of communication arrangements are possible.

As noted above, the balloons 102A-F may collectively function as a mesh network. More specifically, since balloons 102A-F may communicate with one another using free-space optical links or RF links, the balloons may collectively function as a free-space optical or RF mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. Balloon network 100 may also implement station-keeping functions using winds and altitude control or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position. For instance, the balloons may move in response to riding a wind current, or may move in a circular or other pattern as they station keep over a region of interest.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

Other than balloons, drones may fly routes in an autonomous manner, carry cameras for aerial photography, and transport goods from one place to another. The terms "unmanned aerial vehicle (UAV)" and "flying robot" are often used as synonyms for a drone. The spectrum of applications is broad, including aerial monitoring of industrial plants and agriculture fields as well as support for first time responders in case of disasters. For some applications, it is beneficial if a team of drones rather than a single drone is employed. Multiple drones can cover a given area faster or take photos from different perspectives at the same time.

The balloons of FIG. 1 may be high-altitude balloons that are deployed in the stratosphere. As an example, in a high altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. Lateral propulsion may also be employed to affect the balloon's path of travel.

Figure 2:
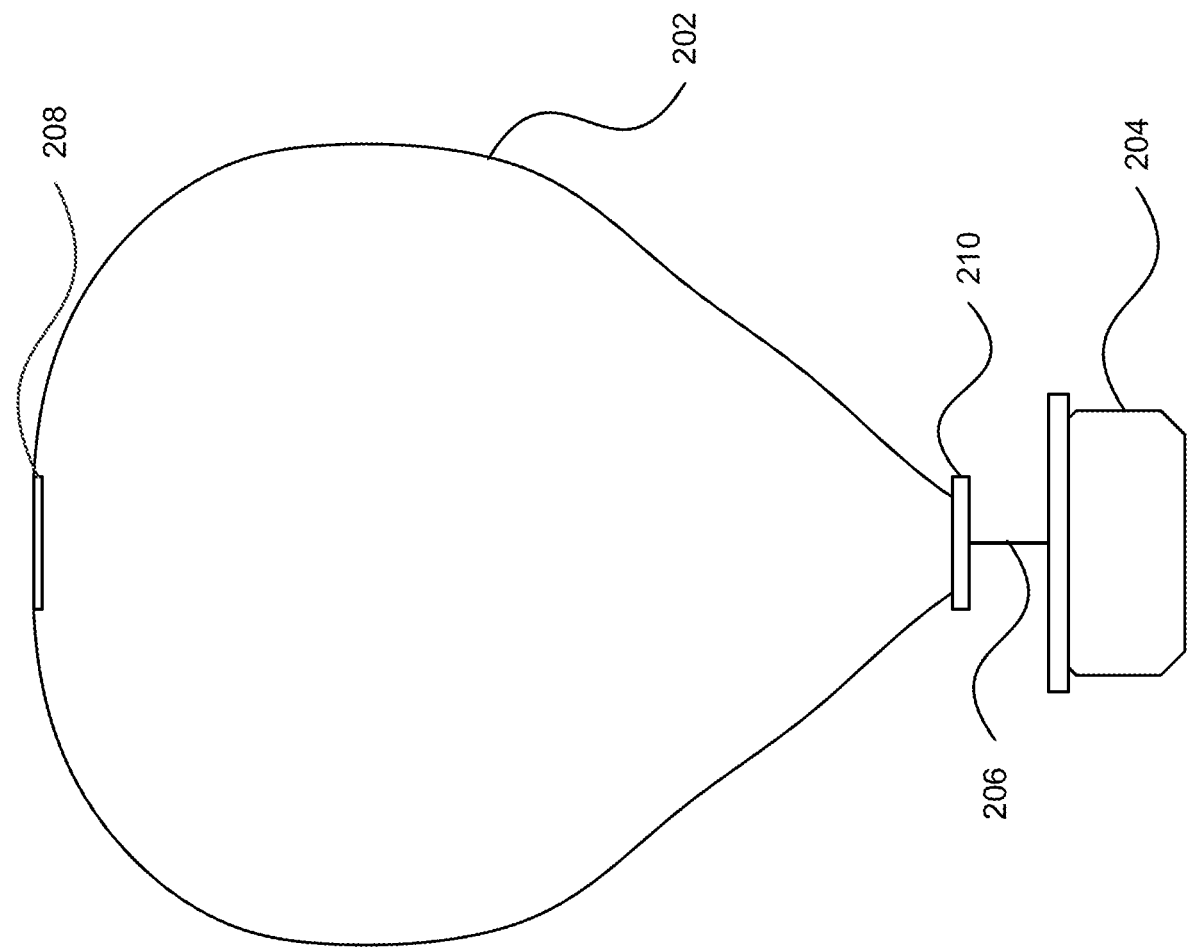
FIG. 2 illustrates a balloon configuration in accordance with aspects of the technology.

In an example configuration, the high altitude balloon platforms include an envelope and a payload, along with various other components. FIG. 2 is one example of a high-altitude balloon 200, which may represent any of the balloons of FIG. 1. shown, the example balloon 200 includes an envelope 202, a payload 204 and a coupling member (e.g., a down connect) 206 therebetween. At least one gore panel forms the envelope, which is configured to maintain pressurized lifting gas therein. For instance, the balloon may be a superpressure balloon. A top plate 208 may be disposed along an upper section of the envelope, while a base plate 210 may be disposed along a lower section of the envelope opposite the top place. In this example, the coupling member 206 connects the payload 204 with the base plate 210.

The envelope 202 may take various shapes and forms. For instance, the envelope 202 may be made of materials such as polyethylene, mylar, FEP, rubber, latex or other thin film materials or composite laminates of those materials with fiber reinforcements imbedded inside or outside. Other materials or combinations thereof or laminations may also be employed to deliver required strength, gas barrier, RF and thermal properties. Furthermore, the shape and size of the envelope 202 may vary depending upon the particular implementation. Additionally, the envelope 202 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Example Systems

Figure 3:
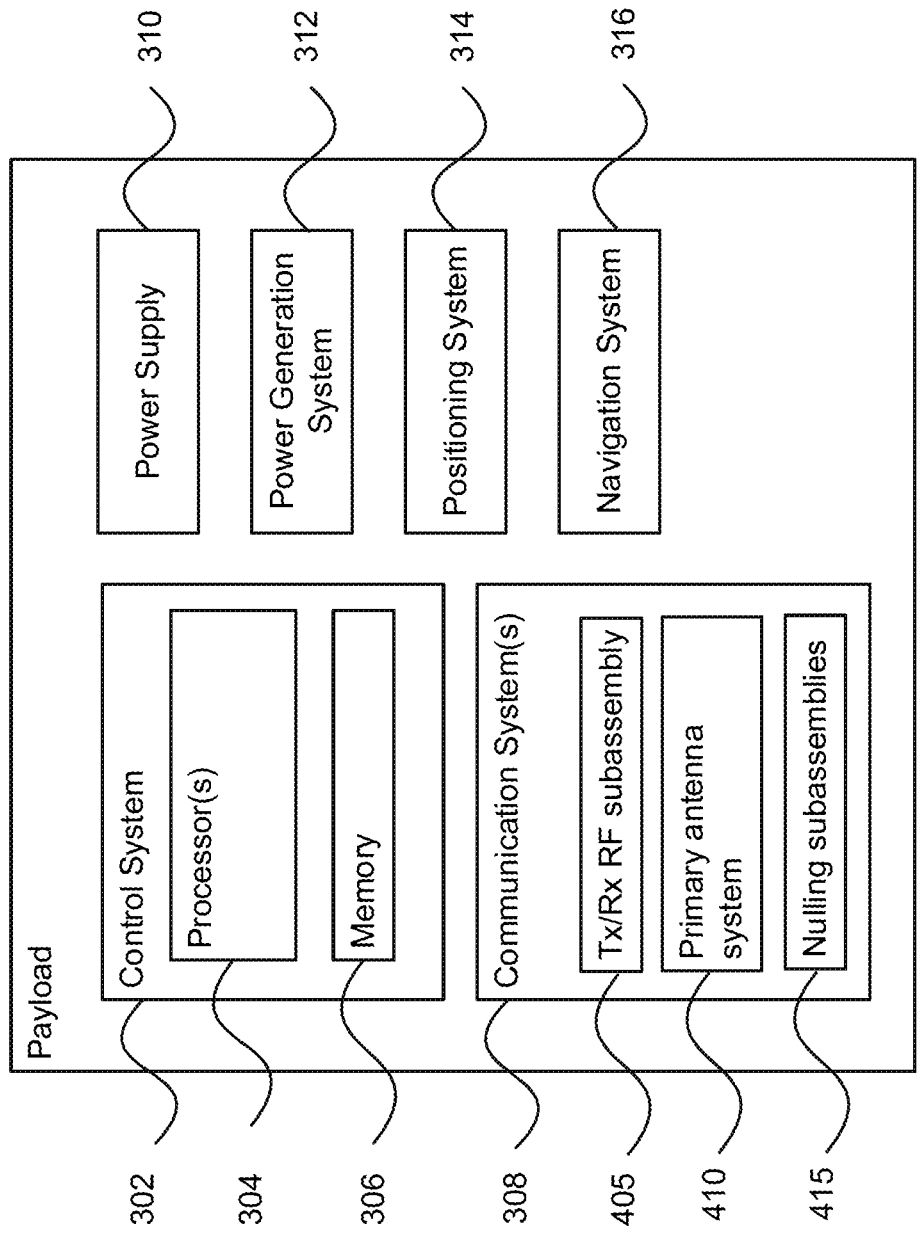
FIG. 3 is an example payload arrangement in accordance with aspects of the technology.

According to one example shown in FIG. 3, a payload 300 of a balloon platform includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a hard-drive, memory card (e.g., thumb drive or SD card), ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 304 can include any conventional processors, such as a commercially available CPU. Alternatively, each processor can be a dedicated component such as an ASIC, controller, or other hardware-based processor. Although FIG. 3 functionally illustrates the processor(s) 304, memory 306, and other elements of the control system 302 as being within the same block, the system can actually comprise multiple processors, computers, computing devices, and/or memories that may or may not be stored within the same physical housing. For example, the memory can be a hard drive or other storage media located in a housing different from that of the control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. By way of example only, the communication system 308 may provide LTE or other telecommunications services. The communication system(s) 308 may include communication components such as one or more transmitters and receivers (or transceivers) and an antenna system having one or more antennas. In accordance with one aspect shown in FIG. 3, the communication system 308 includes a transmit (Tx)/receive (Rx) RF subassembly 405, a primary antenna system 410 and detachable nulling subassemblies 415. The Tx/Rx RF subassembly 405 may include one or more receivers 420 and one or more transmitters 425, as shown in FIG. 4A. The one or more processors 304 is in communication with the one or more receivers 420 and the one or more transmitters 425. The primary antenna system 410 may have multiple sectors with different beams providing coverage for a number of ground-based users. For example, the primary antenna system 410 may have four sectors. Each sector may reach 150 kilometers or more or less from a point on the ground directly below the balloon platform carrying the payload 300. In some implementations, more or less sectors may be covered by the primary antenna system 410 or additional sectors may be covered by additional antenna systems on the communication system 308.

The one or more processors 304 may control the entire communication system 308. Alternatively, one or more additional processors may be incorporated into one or more of the Tx/Rx RF subassembly 405, the primary antenna system 410 and the detachable nulling subassemblies 415 to control various features of the communication system 308.

The primary antenna system 410 shown in FIG. 4A may include nulling activation switches 435, each having at least three contacts $437_1$, $437_2$ and $437_3$, a power divider 440 and a plurality of antenna elements $445_1$, $445_2$, $445_3$ and $445_4$. FIG. 4A shows the nulling activation switches 435 in a nulling bypassed mode, where an RF signal 465 generated by the one or more transmitters 425 is permitted to travel to an input of the power divider 440, which outputs RF signals to respective ones of the plurality of antenna elements $445_1$, $445_2$, $445_3$ and $445_4$ when the nulling activation switches 435 connect contacts $437_1$ and $437_3$ together. The detachable nulling subassemblies 415 may be attached to the primary antenna system 410 via an interface 490, such as a wired or wireless interface.

As shown in FIG. 4B, a nulling activation switch $435_1$ connects contacts $437_1$ and $437_2$ together, such that the RF signal 465 generated by the one or more transmitters 425 is permitted to travel to an input of nulling subassemblies $415_1$ and $415_2$. The detachable nulling subassembly $415_1$ shown in FIG. 4B is for port 1 of sector 1 and may include a power divider $450_1$, phase shifters $455_1$ and $455_2$ and nulling antenna elements $460_1$ and $460_2$. The detachable nulling subassembly $415_2$ shown in FIG. 4B is for port 2 of sector 1 and may include a power divider $450_2$, phase shifters $455_3$ and $455_4$ and nulling antenna elements $460_3$ and $460_4$. When the one or more processors 304 control the nulling activation switch $435_1$ to contacts $437_1$ and $437_2$ together such that the RF signal 465 is permitted to travel to the nulling subassemblies $415_1$ and $415_2$, the nulling subassemblies $415_1$ and $415_2$ are activated by allowing the RF signal 465 to flow through the power dividers $450_1$ and $450_2$ and a plurality of processing chains including the phase shifters $455_1$-$455_4$, and the nulling antenna elements $460_1$-$460_4$, respectively. In one aspect, the power ratio of the power dividers 440 and 450 may be dynamically adjusted. Alternatively, the power ratio of the power dividers 440 and 450 may be selected as a matter of design choice. In other implementations, more or fewer processing chains may be included in the nulling subassemblies 415, and they may be configured such that each one of the processing chains may be individually activated or deactivated, based on which sectors should be nulled. The phase shifters 455 are aligned to generate nulling signals output by the nulling antenna elements 460. The detachable nulling subassembly $415_1$ outputs RF signal $495_1$ to feed the primary antenna system 410 based on the RF signal 465. The detachable nulling subassembly $415_2$ outputs RF signal $495_2$ to feed the primary antenna system 410 based on the RF signal 465 Thus, the primary antenna system 410 generates a beam based on one or both of RF signals $495_1$ and $495_2$.

As shown in FIG. 4C, a nulling activation switch $435_2$ connects contacts $437_1$ and $437_2$ together, such that the RF signal 465 generated by the one or more transmitters 425 is permitted to travel to an input of nulling subassemblies $415_3$ and $415_4$. The detachable nulling subassembly $415_3$ shown in FIG. 4C is for port 1 of sector 2 and may include a power divider $450_1$, phase shifters $455_1$ and $455_2$ and nulling antenna elements $460_1$ and $460_2$. The detachable nulling subassembly $415_4$ shown in FIG. 4C is for port 2 of sector 2 and may include a power divider $450_2$, phase shifters $455_3$ and $455_4$ and nulling antenna elements $460_3$ and $460_4$. When the one or more processors 304 control the nulling activation switch $435_2$ to connect contacts $437_1$ and $437_2$ together such that the RF signal 465 is permitted to travel to the nulling subassemblies $415_3$ and $415_4$, the nulling subassemblies $415_3$ and $415_4$ are activated by allowing the RF signal 465 to flow through the power dividers $450_1$ and $450_2$ and a plurality of processing chains including the phase shifters $455_1$-$455_4$, and the nulling antenna elements $460_1$-$460_4$, respectively. The detachable nulling subassembly $415_3$ outputs RF signal $495_3$ to feed the primary antenna system 410 based on the RF signal 465. The detachable nulling subassembly $415_4$ outputs RF signal $495_4$ to feed the primary antenna system 410 based on the RF signal 465. Thus, the primary antenna system 410 generates a beam based on one or both of RF signals $495_3$ and $495_4$.

As shown in FIG. 4D, a nulling activation switch $435_3$ connects contacts $437_1$ and $437_2$ together, such that the RF signal 465 generated by the one or more transmitters 425 is permitted to travel to an input of nulling subassemblies $415_5$ and $415_6$. The detachable nulling subassembly $415_5$ shown in FIG. 4D is for port 1 of sector 3 and may include a power divider $450_1$, phase shifters $455_1$ and $455_2$ and nulling antenna elements $460_1$ and $460_2$. The detachable nulling subassembly $415_6$ shown in FIG. 4D is for port 2 of sector 3 and may include a power divider $450_2$, phase shifters $455_3$ and $455_4$ and nulling antenna elements $460_3$ and $460_4$. When the one or more processors 304 control the nulling activation switch $435_3$ to connect contacts $437_1$ and $437_2$ together such that the RF signal 465 is permitted to travel to the nulling subassemblies $415_5$ and $415_6$, the nulling subassemblies $415_5$ and $415_6$ are activated by allowing the RF signal 465 to flow through the power dividers $450_1$ and $450_2$ and a plurality of processing chains including the phase shifters $455_1$-$455_4$, and the nulling antenna elements $460_1$-$460_4$, respectively The detachable nulling subassembly $415_5$ outputs RF signal $495_5$ to feed the primary antenna system 410 based on the RF signal 465. The detachable nulling subassembly $415_6$ outputs RF signal $495_6$ to feed the primary antenna system 410 based on the RF signal 465. Thus, the primary antenna system 410 generates a beam based on one or both of RF signals $495_5$ and $495_6$ As shown in FIG. 4E, a nulling activation switch $435_4$ connects contacts $437_1$ and $437_2$ together, such that the RF signal 465 generated by the one or more transmitters 425 is permitted to travel to an input of nulling subassemblies $415_7$ and $415_8$. The detachable nulling subassembly $415_7$ shown in FIG. 4E is for port 1 of sector 4 and may include a power divider $450_1$, phase shifters $455_1$ and $455_2$ and nulling antenna elements $460_1$ and $460_2$. The detachable nulling subassembly $415_8$ shown in FIG. 4E is for port 2 of sector 4 and may include a power divider $450_2$, phase shifters $455_3$ and $455_4$ and nulling antenna elements $460_3$ and $460_4$. When the one or more processors 304 control the nulling activation switch $435_4$ to connect contacts $437_1$ and $437_2$ together such that the RF signal 465 is permitted to travel to the nulling subassemblies $415_7$ and $415_8$, the nulling subassemblies $415_7$ and $415_8$ are activated by allowing the RF signal 465 to flow through the power dividers $450_1$ and $450_2$ and a plurality of processing chains including the phase shifters $455_1$-$455_4$, and the nulling antenna elements $460_1$-$460_4$, respectively. The detachable nulling subassembly $415_7$ outputs RF signal $495_7$ outputs to feed the primary antenna system 410 based on the RF signal 465. The detachable nulling subassembly $415_8$ outputs RF signal $495_8$ to feed the primary antenna system 410 based on the RF signal 465. Thus, the primary antenna system 410 generates a beam based on one or both of RF signals $495_7$ and $495_8$.

Although FIGS. 4B-4E illustrate (for simplification) that detachable nulling subassembly 415 associated with two different ports of a sector output the RF signals 495, the configurations of the nulling activation switches may be modified to provide RF signals associated with only one of the ports of a sector, both ports of each of the 4 sectors, a particular port of each of the 4 sectors, and the like.

Returning to FIG. 3, the payload 300 is illustrated as also including a power supply 310 to supply power to the various components of balloon. The power supply 310 could include one or more rechargeable batteries or other energy storage systems like capacitors or regenerative fuel cells. In addition, the balloon 300 may include a power generation system 312 in addition to or as part of the power supply. The power generation system 312 may include solar panels, stored energy (hot air), relative wind power generation, or differential atmospheric charging (not shown), or any combination thereof, and could be used to generate power that charges and/or is distributed by the power supply 310.

The payload 300 may additionally include a positioning system 314. The positioning system 314 could include, for example, a global positioning system (GPS), an inertial navigation system, and/or a star-tracking system. The positioning system 314 may additionally or alternatively include various motion sensors (e.g., accelerometers, magnetometers, gyroscopes, and/or compasses).

Payload 300 may include a navigation system 316 separate from, or partially or fully incorporated into the control system 302. The navigation system 316 may implement station-keeping functions to maintain position within and/or move to a position in accordance with a desired topology or other service requirement. In particular, the navigation system 316 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite based system and communicated to the high-altitude balloon. In other embodiments, specific balloons may be configured to compute altitudinal and/or lateral adjustments for other balloons and transmit the adjustment commands to those other balloons.

Figure 5:
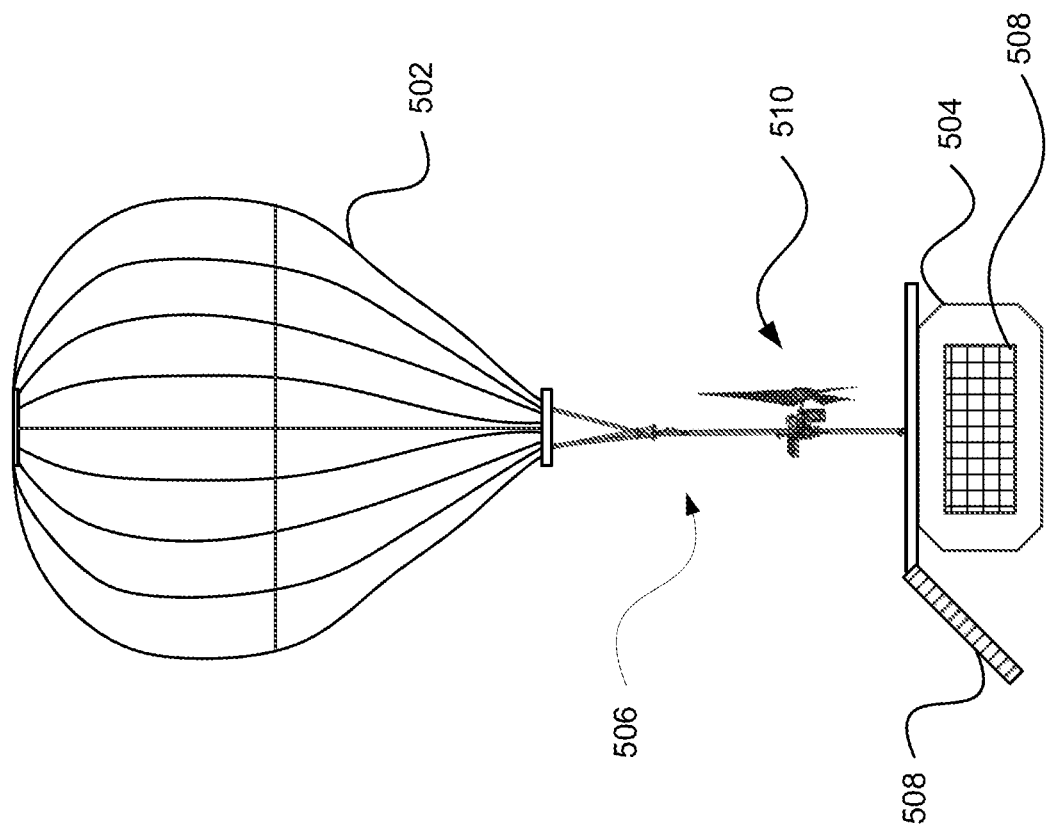
FIG. 5 is an example of a balloon platform with lateral propulsion in accordance with aspects of the technology.

In order to change lateral positions or velocities, the platform may include a lateral propulsion system. FIG. 5 illustrates one example configuration 500 of a balloon platform with propeller-based lateral propulsion, which may represent any of the balloons of FIG. 1. As shown, the example 500 includes an envelope 502, a payload 504 and a down connect member 506 disposed between the envelope 502 and the payload 504. Cables or other wiring between the payload 504 and the envelope 502 may be run within the down connect member 506. One or more solar panel assemblies 508 may be coupled to the payload 504 or another part of the balloon platform. The payload 504 and the solar panel assemblies 508 may be configured to rotate about the down connect member 506 (e.g., up to 360° rotation), for instance to align the solar panel assemblies 508 with the sun to maximize power generation. Example 500 also illustrates a lateral propulsion system 510. While this example of the lateral propulsion system 510 is one possibility, the location could also be fore and/or aft of the payload section 504, or fore and/or aft of the envelope section 502, or any other location that provides the desired thrust vector.

The navigation system is able to evaluate data obtained from onboard navigation sensors, such as an inertial measurement unit (IMU) and/or differential GPS, received data (e.g., weather information), and/or other sensors such as health and performance sensors (e.g., a force torque sensor) to manage operation of the balloon's systems. When decisions are made to activate the lateral propulsion system, for instance to station keep, the navigation system then leverages received sensor data for position, wind direction, altitude and power availability to properly point the propeller and to provide a specific thrust condition for a specific duration or until a specific condition is reached (e.g., a specific velocity or position is reached, while monitoring and reporting overall system health, temperature, vibration, and other performance parameters).

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Further, the one or more receivers 420 may be configured to receive signals from a simulation and control system on the ground. For example, a simulation and control system 120 may be part of the ground base station 106 or the ground base station 112 shown in FIG. 1, or another type of ground station. Alternatively, the simulation and control system 120 may be separate from any node and operate independently. The simulation and control system 120 may run simulations based on the location of the HAP, and determine whether nulling should be enabled and, if so, on which sectors. The simulation aims to maximize total number of subscribers or some other parameter to be optimized. For example, the simulation and control system 120 may make decisions as to whether to control the nulling activation switch 435 to activate the detachable nulling subassemblies 415 shown in FIGS. 4A-4E. Such decisions may be based on one or more of a location of the HAP, knowledge of ground terrestrial locations, knowledge of country borders, and knowledge of service regions. Further, various constraints need to be taken into consideration. For example, a limit may need to be established as to a total power flux density across borders that should not be exceeded from all HAP transmissions (i.e., the sum of all HAP transmissions). Further, a limit may need to be established as to a total power flux density to terrestrial towers from all HAP transmissions (i.e., the sum of all HAP transmissions). In addition, it may be necessary to prohibit uplink (UL) interference from exceeding some predetermined threshold. The one or more receivers 420 may detect such UL interference, which may be caused by UE transmissions sent to the terrestrial towers, Total power flux density at any and all relevant points on the ground may be constantly monitored based on the sum of all HAP transmissions. When a simulation shows that the signals on the ground exceed a particular threshold, this mechanism can be triggered. In addition, the UL noise level (interference level) can be measured to determine whether to turn on this mechanism based on a dynamic measurement.

As shown in FIGS. 4A-4E, the one or more transmitters 425 in the Tx/Rx RF subassembly 405 outputs the RF signal 465 to an input of the power divider 440 and a nulling activation switch 435 in the primary antenna system 410. The one or more processors 304 output a signal 470 to control the nulling activation switch 435 to selectively feed the RF signal 465 to the detachable nulling subassemblies 415 by connecting the contacts $437_1$ and $437_2$ together. Thus, when the RF signal 465 is fed to the input of the power dividers 450 in the detachable nulling subassemblies 415, the phase shifters 455 are aligned to generate nulling signals output by the nulling antenna elements 460. Beams are generally formed by having antenna arrays with multiple elements. The beams are steered or the beam shape is changed by having different gain and phase for each of the elements. We can change the gain or the phase and create beams with more gain, steer the beams in different directions, create nulls in the beams, etc. Phase can be changed by adjusting or selecting specific phase shifters. Alternatively, phase can be changed by changing cable lengths between elements (e.g., changing traces the between elements).

Referring to FIG. 4A-4E, the one or more receivers 420 may detect beams generated by the primary antenna system 410 and the detachable nulling subassemblies 415. Based on these beams, the one or more processors 304 may communicate with the simulation and control system 120 in the ground base station 112 shown in FIG. 1, so that it may perform analysis and calculations to determine whether the detachable nulling subassemblies 415 should be activated and, if so, how nulling activation switches 435 should be controlled so that the beam pattern generated by the primary antenna system 410 is changed by beams generated by the detachable nulling subassemblies 415.

Multiple elements may be combined to form beams by using appropriate gains and phases for different antenna elements. The final composite beam pattern may depend on one or more of a beam pattern for the individual elements, distance between the individual elements and gain and phase used on the individual elements. The nulling sub-assemblies provide the ability to change the final beam pattern because they provide elements whose gain and phase can be changed as required. This increases the degrees of freedom available and provides a way to create nulling The primary antenna system 410 generates beams that form a footprint on the ground for providing communication service to a plurality of terrestrial users. The one or more processors 304 may be configured to communicate with the simulation and control system 120 to monitor and analyze the HAP's position with regard to a country border and/or an object (e.g., a terrestrial tower), as well as establishing various thresholds and standards (e.g., International Telecommunication Union (ITU) standards) that should not be exceeded. The interface 490 allows the HAP operator the flexibility to disconnect the detachable nulling subassemblies 415 and fly without including it in the payload.

Specific ones or all of the sector processing chains in the detachable nulling subassemblies 415 may be deactivated or activated in response to the one or more processors 304 detecting the location of the HAP, the location of one or more other HAPs, the location of users, the location of terrestrial towers, LTE simulations, and/or an estimation of power flux density on the ground.

Figure 6:
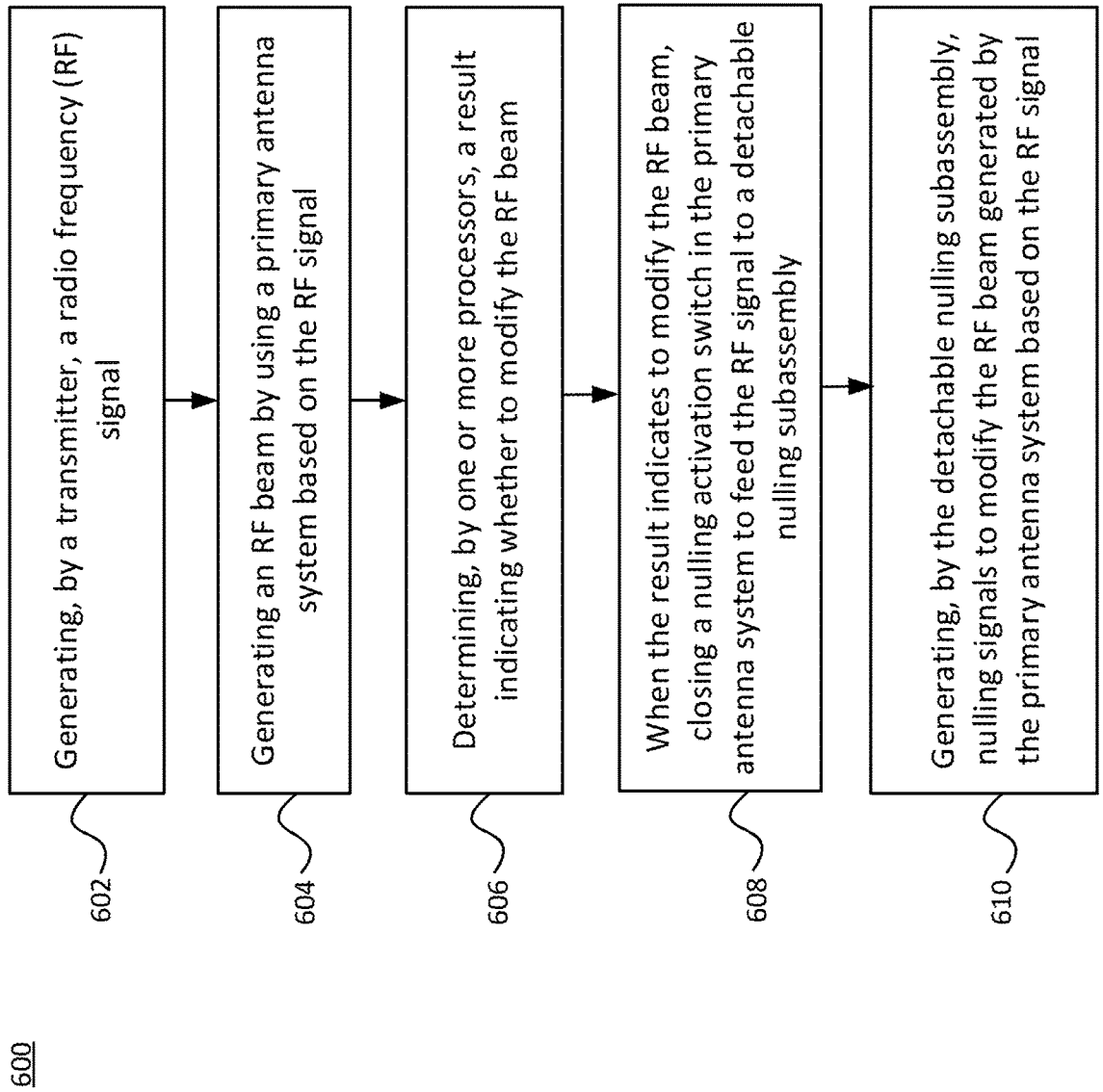
FIG. 6 is a flow diagram of a method in accordance with aspects of the technology.

FIG. 6 shows an example flow diagram in accordance with aspects of the technology. More specifically, FIG. 6 shows a flow of an example method 600 for detecting selective activation of antenna notch elements performed.

At block 602 of FIG. 6, the transmitter 425 generates the RF signal 465.

At block 604 of FIG. 6, an RF beam is generated based on the RF signal by using the primary antenna system 410.

At block 606 of FIG. 6, the one or more processors 304 determines a result indicating whether to modify the RF beam.

At block 608 of FIG. 6, when the result indicates to modify the RF beam, a nulling activation switch 435 in the primary antenna system 410 is closed to feed the RF signal 465 to a detachable nulling subassembly 415.

At block 610 of FIG. 6, the detachable nulling subassembly 415 generates nulling signals to modify the RF beam generated by the primary antenna system 410 based on the RF signal 465.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A communication apparatus for a high-altitude platform (HAP), the communication apparatus comprising:
a transmitter configured to generate a radio frequency (RF) signal;
a plurality of antenna elements configured to generate a beamforming signal;
a first power divider configured to divide the RF signal or a modified form of the RF signal into a plurality of output signals fed to respective inputs of the plurality of antenna elements;
a nulling activation switch having a first contact configured to receive the RF signal from the transmitter and a second contact configured to feed the RF signal to the first power divider; and
a detachable nulling subassembly configured to generate the modified form of the RF signal, the detachable nulling subassembly having at least one input port in communication with a third contact of the nulling activation switch and at least one output port in communication with the first power divider,
wherein the detachable nulling subassembly is configured to generate the modified form of the RF beam signal when the nulling activation switch is controlled to connect the first contact to the third contact; and
wherein the detachable nulling subassembly is bypassed when the nulling activation switch is controlled to connect the first contact to the second contact.

2. The communication apparatus of claim 1, wherein the detachable nulling subassembly includes:
a second power divider having an input and a plurality of outputs,
a plurality of phase shifters, and
a plurality of nulling antenna elements.

3. The communication apparatus of claim 2, wherein the detachable nulling subassembly is in communication with the nulling activation switch via an interface.

4. The communication apparatus of claim 3, wherein the interface is a wired or wireless interface.

5. The communication apparatus of claim 3, wherein the interface is a wired harness connector.

6. The communication apparatus of claim 2, wherein the RF signal is fed to the input of the second power divider when the nulling activation switch is controlled to connect the first contact to the third contact.

7. The communication apparatus of claim 6, wherein each output of the second power divider feeds the RF signal to a respective processing chain including a phase shifter connected in series with a nulling antenna element.

8. The communication apparatus of claim 1, wherein the nulling activation switch is controlled to connect the contacts based on one or more of a location of a high-altitude platform, knowledge of ground terrestrial locations, knowledge of country borders, or knowledge of service regions.

9. The communication apparatus of claim 1, wherein a limit is established as to a total power flux density across borders that should not be exceeded from a sum of all HAP transmissions or a total power flux density to terrestrial towers from the sum of all HAP transmissions.

10. A method for nulling a radio frequency (RF) beam for a high-altitude platform (HAP), the method comprising:
generating, by a transmitter, an RF signal;
generating, by a plurality of antenna elements, a beamforming signal;
dividing, by a power divider, the RF signal or a modified form of the RF signal into a plurality of output signals fed to respective inputs of the plurality of antenna elements;
determining, by one or more processors, a result indicating whether to modify the beamforming signal;
when the result indicates to modify the beamforming signal, controlling, by the one or more processors, a nulling activation switch to insert a detachable nulling subassembly between the transmitter and the power divider to modify the beamforming signal; and
when the result indicates not to modify the beamforming signal, controlling by the one or more processors, the nulling activation switch to bypass the detachable nulling subassembly.

11. The method of claim 10, wherein the controlling the nulling activation switch to insert the detachable nulling subassembly between the transmitter and the power divider includes routing the RF signal through the detachable nulling subassembly, which generates the modified form of the RF signal in order modify the beamforming signal.

12. The method of claim 11, wherein the controlling the nulling activation switch is based on one or more of a location of a high-altitude platform, knowledge of ground terrestrial locations, knowledge of country borders, or knowledge of service regions.

13. The method of claim 11, wherein the controlling the nulling activation switch is based on whether a total power flux density across borders or a total power flux density to terrestrial towers is exceeded.

14. A non-transitory computer readable medium on which instructions are stored, the instructions when executed by one or more processors in a high-altitude platform (HAP) node, cause the one or more processors to perform a method for nulling a beamforming signal, the method comprising:
generating a radio frequency (RF) signal;
generating a beamforming signal by processing the RF signal or a modified form of the RF signal;
determining a result indicating whether to modify the beamforming signal;
when the result indicates to modify the beamforming signal, employing a detachable nulling subassembly to modify the beamforming signal by generating the modified form of the RF signal; and
when the result indicates not to modify the beamforming signal, bypassing the detachable nulling subassembly.

15. The non-transitory computer readable medium of claim 14, wherein employing the detachable nulling subassembly includes inserting the detachable nulling subassembly between a transmitter that generates the RF signal and a power divider that processes the modified form of the RF signal by dividing the modified form of the RF signal into a plurality of output signals fed to respective inputs of a plurality of antenna elements.

16. The non-transitory computer readable medium of claim 15, wherein:
the detachable nulling subassembly is inserted between the transmitter and the power divider via a nulling activation switch and an interface, and
the interface is a wired or wireless interface.

17. The non-transitory computer readable medium of claim 16, wherein the nulling activation switch is controlled based on one or more of a location of a high-altitude platform, knowledge of ground terrestrial locations, knowledge of country borders, or knowledge of service regions.

18. The non-transitory computer readable medium of claim 16, wherein the nulling activation switch is controlled based on whether a total power flux density across borders or a total power flux density to terrestrial towers is exceeded.

19. The non-transitory computer readable medium of claim 14, the method further comprising establishing a limit as to a total power flux density across borders that should not be exceeded from a sum of all HAP transmissions or a total power flux density to terrestrial towers from the sum of all HAP transmissions.

* * * * *